(12) United States Patent
Marshall

(10) Patent No.: US 9,759,158 B2
(45) Date of Patent: Sep. 12, 2017

(54) DUAL FUNCTION CASCADE INTEGRATED VARIABLE AREA FAN NOZZLE AND THRUST REVERSER

(75) Inventor: Richard M. Marshall, Kirkland, CA (US)

(73) Assignee: UNITED TECHNOLOGIES CORPORATIO, Hartford, CT (US)

( * ) Notice: Subject to any disclaimer, the term of this patent is extended or adjusted under 35 U.S.C. 154(b) by 676 days.

(21) Appl. No.: 13/332,529

(22) Filed: Dec. 21, 2011

(65) Prior Publication Data

US 2012/0291415 A1 Nov. 22, 2012

Related U.S. Application Data

(63) Continuation-in-part of application No. 12/440,746, filed as application No. PCT/US2006/039990 on Oct. 12, 2006, now Pat. No. 8,104,262.

(51) Int. Cl.
| | |
|---|---|
| *F02K 1/72* | (2006.01) |
| *F02K 1/09* | (2006.01) |
| *F02K 1/42* | (2006.01) |

(52) U.S. Cl.
CPC .............. *F02K 1/09* (2013.01); *F02K 1/42* (2013.01); *F02K 1/72* (2013.01); *Y02T 50/671* (2013.01)

(58) Field of Classification Search
CPC ..... F02K 1/70; F02K 1/72; F02K 1/74; F02K 3/04; F02K 3/06; F02K 3/075; F02K 1/08; F02K 1/09
USPC ................ 60/226.1–226.3, 230; 239/265.19, 239/265.33, 265.31
See application file for complete search history.

(56) References Cited

U.S. PATENT DOCUMENTS

| | | | | |
|---|---|---|---|---|
| 2,865,169 | A | | 12/1958 | Hausmann |
| 3,262,268 | A | | 7/1966 | Beavers |
| 3,287,906 | A | | 11/1966 | McCormick |
| 3,779,010 | A | * | 12/1973 | Chamay ............... F02K 1/09 239/265.31 |
| 4,030,291 | A | * | 6/1977 | Sargisson ............ F02K 1/70 239/265.29 |
| 4,501,393 | A | * | 2/1985 | Klees ................ F02K 1/1207 181/215 |

(Continued)

FOREIGN PATENT DOCUMENTS

| | | |
|---|---|---|
| GB | 1211923 A | 11/1970 |
| GB | 1516041 | 6/1978 |

(Continued)

OTHER PUBLICATIONS

Search Report and Written Opinion dated Jun. 22, 2007 for PCT/US2006/039990.

(Continued)

*Primary Examiner* — Craig Kim
(74) *Attorney, Agent, or Firm* — Carlson, Gaskey & Olds, P.C.

(57) ABSTRACT

A gas turbine engine system according to an exemplary aspect of the present disclosure may include a core engine defined about an axis, a fan driven by the core engine about the axis to generate bypass flow, and at least one integrated mechanism in communication with the bypass flow. The bypass flow defines a bypass ratio greater than about six (6). The at least one integrated mechanism includes a variable area fan nozzle (VAFN) and thrust reverser, and a plurality of positions to control bypass flow.

25 Claims, 4 Drawing Sheets

(56) References Cited

U.S. PATENT DOCUMENTS

| | | | | |
|---|---|---|---|---|
| 4,860,537 | A | * | 8/1989 | Taylor .......................... 60/226.1 |
| 4,969,325 | A | * | 11/1990 | Adamson et al. ........... 60/226.1 |
| 5,255,850 | A | * | 10/1993 | Cockerham ............... F02K 1/56 |
| | | | | 239/265.19 |
| 5,655,360 | A | * | 8/1997 | Butler ...................... 239/265.29 |
| 5,915,917 | A | | 6/1999 | Eveker et al. |
| 6,148,605 | A | * | 11/2000 | Lardellier ....................... 60/204 |
| 7,721,549 | B2 | * | 5/2010 | Baran ..................... F02K 1/002 |
| | | | | 239/265.19 |
| 8,127,529 | B2 | | 3/2012 | Pero et al. |
| 8,511,973 | B2 | * | 8/2013 | Ramlaoui .............. B64D 29/06 |
| | | | | 415/128 |
| 2008/0302907 | A1 | * | 12/2008 | Schafer .......................... 244/54 |
| 2009/0245997 | A1 | | 10/2009 | Hurwitz et al. |
| 2009/0288386 | A1 | * | 11/2009 | Marshall .................. F02K 1/09 |
| | | | | 60/204 |
| 2010/0005777 | A1 | * | 1/2010 | Marshall .................. F02K 1/09 |
| | | | | 60/204 |
| 2010/0148396 | A1 | | 6/2010 | Xie et al. |
| 2010/0326047 | A1 | * | 12/2010 | Gabel ....................... F02K 1/72 |
| | | | | 60/226.2 |
| 2010/0331139 | A1 | | 12/2010 | McCune |
| 2013/0266423 | A1 | * | 10/2013 | Vauchel ................. F02K 3/025 |
| | | | | 415/148 |

FOREIGN PATENT DOCUMENTS

| | | |
|---|---|---|
| GB | 2041090 | 9/1980 |
| JP | 4324149 B2 | 9/2009 |
| JP | 4749119 B2 | 8/2011 |
| RU | 2315887 C2 | 1/2008 |
| WO | 2007038674 | 4/2007 |

OTHER PUBLICATIONS

Notification of Transmittal of The International Preliminary Report on Patentability dated Dec. 12, 2008 for PCT/US2006/039990.

International Preliminary Report on Patentability dated Mar. 2, 2009.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

European Search Report for EP Application No. 12195283.2 dated Sep. 1, 2016.

\* cited by examiner

DUAL FUNCTION CASCADE INTEGRATED VARIABLE AREA FAN NOZZLE AND THRUST REVERSER

CROSS-REFERENCE TO RELATED APPLICATIONS

This application is a continuation-in-part of U.S. application Ser. No. 12/440,746 filed Mar. 11, 2009 now U.S. Pat. No. 8,104,262, which is a National Phase application of PCT/US2006/039990 filed Oct. 12, 2006.

BACKGROUND

This invention relates to gas turbine engines and, more particularly, to a gas turbine engine having a variable fan nozzle integrated with a thrust reverser of the gas turbine engine.

Gas turbine engines are widely known and used for power generation and vehicle (e.g., aircraft) propulsion. A typical gas turbine engine includes a compression section, a combustion section, and a turbine section that utilize a primary airflow into the engine to generate power or propel the vehicle. The gas turbine engine is typically mounted within a housing, such as a nacelle. A bypass airflow flows through a passage between the housing and the engine and exits from the engine at an outlet.

Presently, conventional thrust reversers are used to generate a reverse thrust force to slow forward movement of a vehicle, such as an aircraft. One type of conventional thrust reverser utilizes a moveable door stowed near the rear of the nacelle. After touch-down of the aircraft for landing, the door moves into the bypass airflow passage to deflect the bypass airflow radially outwards into cascades, or vents, that direct the discharge airflow in a forward direction to slow the aircraft. Although effective, this and other conventional thrust reversers serve only for thrust reversal and, when in the stowed position for non-landing conditions, do not provide additional functionality. The use of a variable area fan nozzle (VAFN) has been proposed for low pressure ratio fan designs to improve the propulsive efficiency of high bypass ratio gas turbine engines. Integrating the VAFN functionality into a common set of thrust reverser cascades operated by a common actuation system represents a significant reduction in complexity and weight.

SUMMARY

A gas turbine engine system according to an exemplary aspect of the present disclosure may include a core engine defined about an axis, a fan driven by the core engine about the axis to generate bypass flow, and at least one integrated mechanism in communication with the bypass flow. The bypass flow defines a bypass ratio greater than about six (6). The at least one integrated mechanism includes a variable area fan nozzle (VAFN) and thrust reverser, and a plurality of positions to control bypass flow.

In a further non-limiting embodiment of any of the foregoing gas turbine engine system embodiments, the bypass flow is arranged to communicate with an exterior environment when the integrated mechanism is in a deployed position.

In a further non-limiting embodiment of any of the foregoing gas turbine engine system embodiments, the integrated mechanism includes a plurality of apertures to enable the communication of the bypass flow with the exterior environment when the integrated mechanism is in the deployed position.

In a further non-limiting embodiment of any of the foregoing gas turbine engine system embodiments, the integrated mechanism includes a single actuator set to move between the plurality of positions.

In a further non-limiting embodiment of any of the foregoing gas turbine engine system embodiments, the thrust reverser has a stowed position and a deployed position to divert the bypass flow in a thrust reversing direction.

In a further non-limiting embodiment of any of the foregoing gas turbine engine system embodiments, a gear system is driven by the core engine. The fan is driven by the gear system. The gear system defines a gear reduction ratio of greater than about 2.3.

In a further non-limiting embodiment of any of the foregoing gas turbine engine system embodiments, a gear system is driven by the core engine. The fan is driven by the gear system. The gear system defines a gear reduction ratio of greater than 2.5.

In a further non-limiting embodiment of any of the foregoing gas turbine engine system embodiments, the core engine includes a low pressure turbine which defines a pressure ratio that is greater than about five (5).

In a further non-limiting embodiment of any of the foregoing gas turbine engine system embodiments, the core engine includes a low pressure turbine which defines a pressure ratio that is greater than five (5).

In a further non-limiting embodiment of any of the foregoing gas turbine engine system embodiments, the at least one integrated mechanism is arranged to change a pressure ratio across the fan.

In a further non-limiting embodiment of any of the foregoing gas turbine engine system embodiments, the bypass ratio is greater than about 10.

In a further non-limiting embodiment of any of the foregoing gas turbine engine system embodiments, the bypass ratio is greater than 10.

In a further non-limiting embodiment of any of the foregoing gas turbine engine system embodiments, a gear system is driven by the core engine. The fan is driven by the gear system with a gear reduction ratio greater than 2.5. The gear system is an epicycle gear train. The core engine includes a low pressure turbine which defines a pressure ratio that is greater than five (5).

A gas turbine engine according to another exemplary aspect of the present disclosure may include a core engine defined about an axis, a fan couple to be driven by said core engine about the axis to generate a bypass flow, and at least one integrated mechanism in communication with the bypass flow. The core engine includes at least a low pressure turbine which defines a pressure ratio that is greater than about five (5). The at least one integrated mechanism includes a variable area fan nozzle (VAFN) and a thrust reverser. The integrated mechanism also may includes a plurality of positions to control bypass flow. The integrated mechanism includes a section common to the thrust reverser and VAFN.

In a further non-limiting embodiment of any of the foregoing gas turbine engine embodiments, the integrated mechanism includes at least one actuator set to move between the plurality of positions.

In a further non-limiting embodiment of any of the foregoing gas turbine engine embodiments, the thrust reverser has a stowed position and a deployed position to divert the bypass flow in a thrust reversing direction.

In a further non-limiting embodiment of any of the foregoing gas turbine engine embodiments, the common section is moveable between a plurality of axial positions and has a plurality of apertures providing a flow path for the bypass flow to reach an exterior environment of the gas turbine engine.

In a further non-limiting embodiment of any of the foregoing gas turbine engine embodiments, a gear system is included. The core engine drives the fan via the gear system, which defines a gear reduction ratio of greater than about 2.3.

In a further non-limiting embodiment of any of the foregoing gas turbine engine embodiments, a gear system is included. The core engine drives the fan via the gear system, which defines a gear reduction ratio of greater than 2.5.

In a further non-limiting embodiment of any of the foregoing gas turbine engine embodiments, the bypass flow defines a bypass ratio greater than about ten (10).

In a further non-limiting embodiment of any of the foregoing gas turbine engine embodiments, the bypass flow defines a bypass ratio greater than ten (10).

In a further non-limiting embodiment of any of the foregoing gas turbine engine embodiments, the thrust reverser includes a blocker door moveable between a stowed position and a deployed position and a link having one end connected to the blocker door and an opposite end connected to a support.

In a further non-limiting embodiment of any of the foregoing gas turbine engine embodiments, the blocker door includes a slot having a T-shaped cross section, the slot slidably receiving the link.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1:
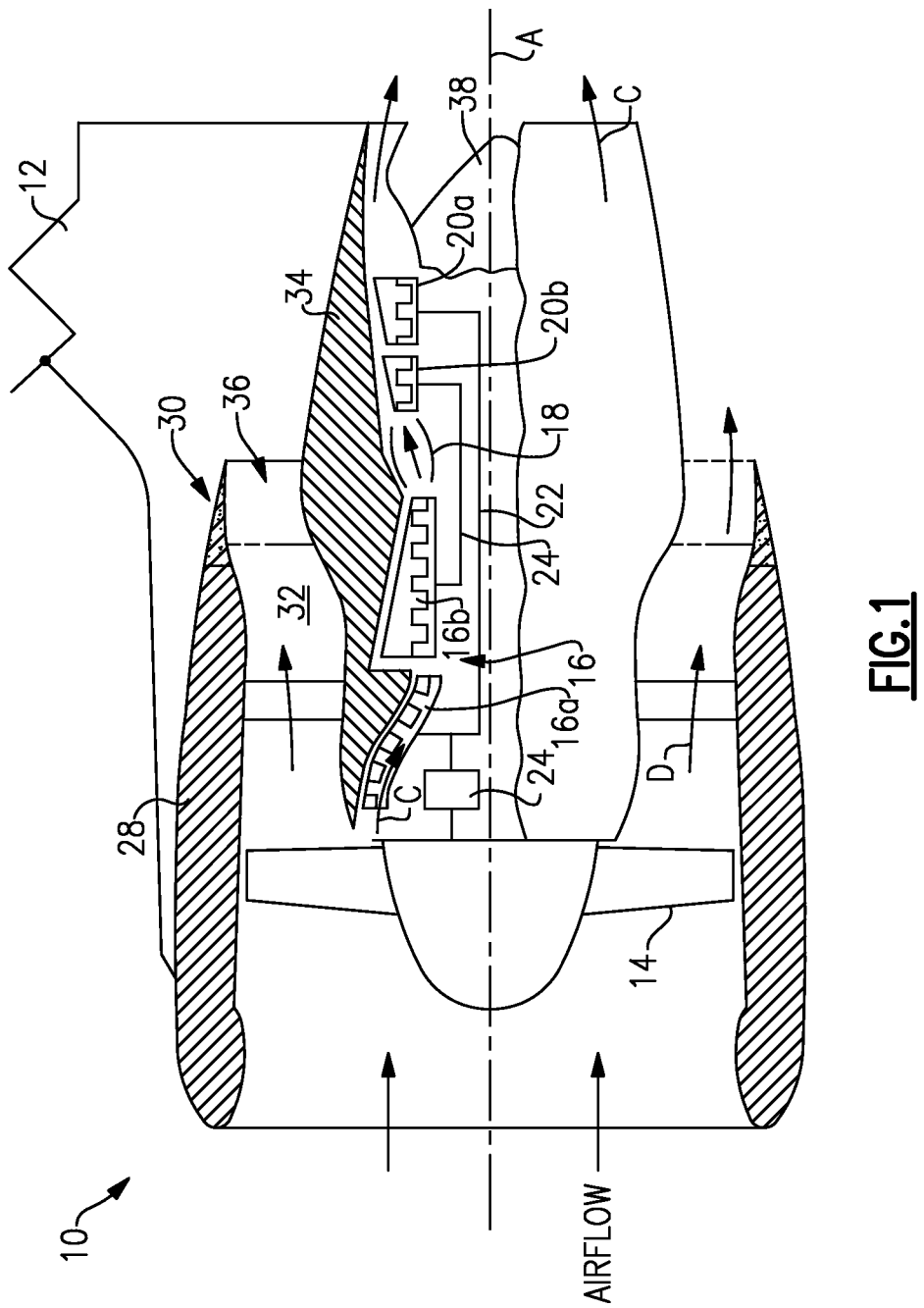
FIG. 1 illustrates selected portions of an example gas turbine engine system having a mechanism that integrates a variable fan nozzle integrated and a thrust reverser.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22 and 24 (e.g., spools) to rotationally drive the compressors 16a, 16b and the fan 14 in response to the expansion. In this example, the rotor 22 also drives the fan 14 through a gear train 24.

The engine 10 is preferably a high-bypass geared architecture aircraft engine. In one disclosed, non-limiting embodiment, the engine 10 bypass ratio is greater than about six (6) to ten (10), the gear train 22 is an epicyclic gear train such as a planetary gear system or other gear system with a gear reduction ratio of greater than about 2.3 and the low pressure turbine 18 has a pressure ratio that is greater than about 5. In the example shown, the gas turbine engine 10 is a high bypass turbofan arrangement. In one example, the bypass ratio is greater than 10, and the fan 14 diameter is substantially larger than the diameter of the low pressure compressor 16a. The low pressure turbine 20a has a pressure ratio that is greater than 5, in one example. The gear train 24 is an epicycle gear train, for example, a star gear train, providing a gear reduction ratio of greater than 2.5. It should be understood, however, that the above parameters are only exemplary of a contemplated geared turbofan engine. That is, the invention is applicable to other engines.

An outer housing, nacelle 28, (also commonly referred to as a fan nacelle) extends circumferentially about the fan 14. A fan bypass passage 32 extends between the nacelle 28 and an inner housing, inner cowl 34, which generally surrounds the compressors 16a, 16b and turbines 20a, 20b. In this example, the gas turbine engine 10 includes integrated mechanisms 30 that are coupled to the nacelle 28. The integrated mechanisms 30 integrate functions of a variable fan nozzle and a thrust reverser, as will be described below. Any number of integrated mechanisms 30 may be used to meet the particular needs of an engine. In this example, two integrated mechanisms 30 are used, one on each semicircular half of the nacelle 28.

In operation, the fan 14 draws air into the gas turbine engine 10 as a core flow, C, and into the bypass passage 32 as a bypass air flow, D. The bypass air flow D is discharged as a discharge flow through a rear exhaust 36 associated with the integrated mechanism 30 near the rear of the nacelle 28 in this example. The core flow C is discharged from a passage between the inner cowl 34 and a tail cone 38.

For the gas turbine engine 10 shown FIG. 1, a significant amount of thrust may be provided by the discharge flow due to the high bypass ratio. Thrust is a function of density, velocity, and area. One or more of these parameters can be manipulated to vary the amount and direction of thrust provided or to enhance conditions for aircraft control, operation of the fan 14, operation of other components associated with the bypass passage 32, or operation of the gas turbine engine 10. For example, an effective reduction in area of the rear exhaust 36 causes an air pressure increase within the bypass passage 32 that in turn changes a pressure ratio across the fan 14.

In the disclosed example, the integrated mechanism 30 includes a structure associated with the rear exhaust 36 to change one or more of these parameters. However, it should be understood that the bypass flow or discharge flow may be effectively altered by other than structural changes, for example, by altering a flow boundary layer. Furthermore, it should be understood that effectively altering a cross-sectional area of the rear exhaust 36 is not limited to physical locations approximate to the exit of the nacelle 28, but rather, includes altering the bypass flow D by any suitable means.

Figure 2:
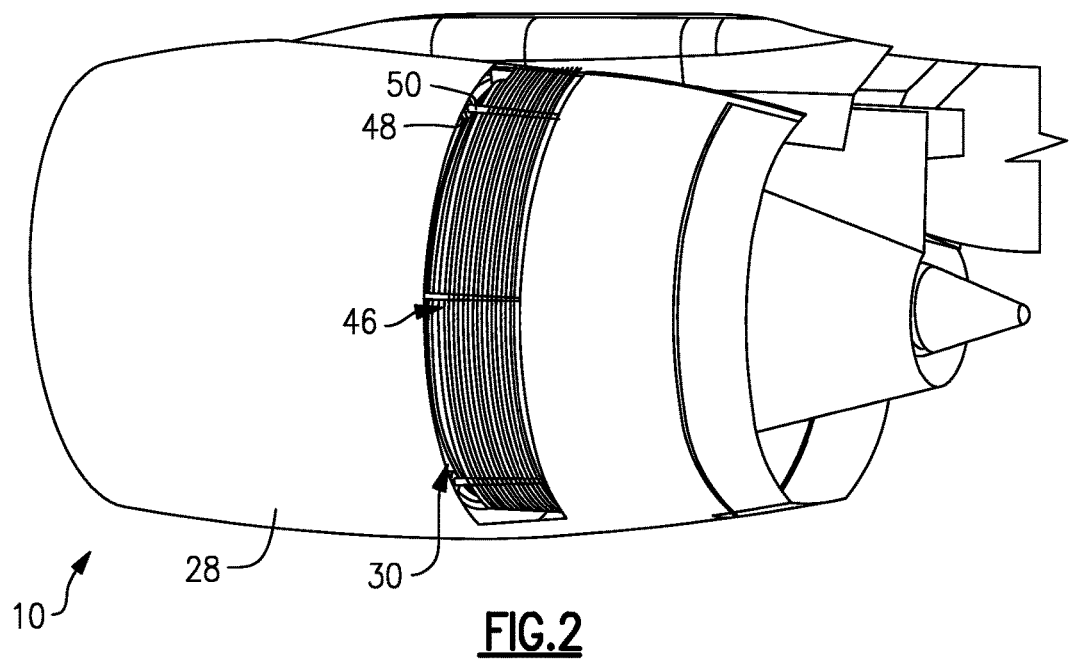
FIG. 2 illustrates a perspective view of the example gas turbine engine system with cascades exposed for thrust reversal.
Figure 3A:
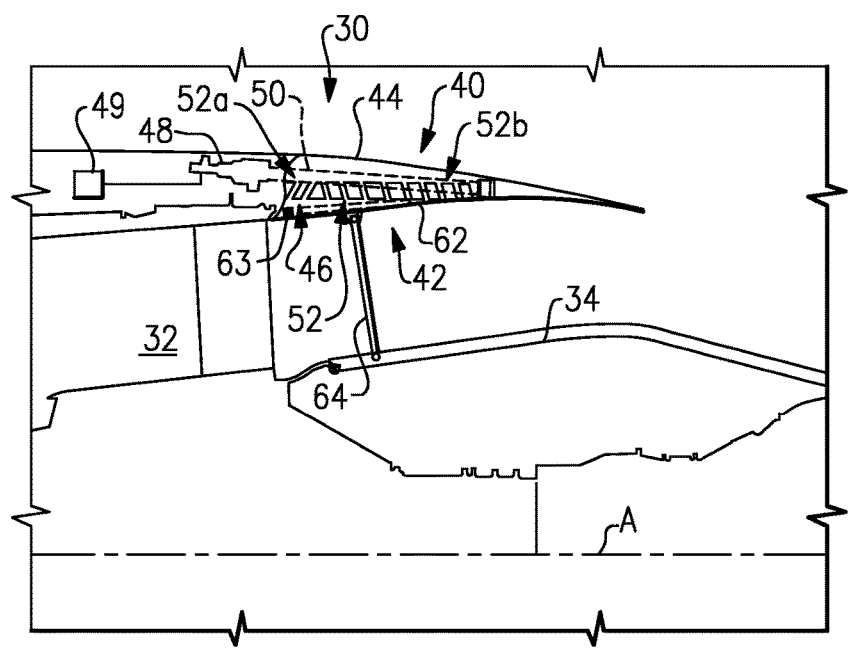
FIG. 3A illustrates a schematic view of the mechanism having an axially moveable section that is in a closed position.

Referring to FIGS. 2 and 3A, the integrated mechanism 30 in this example includes a nozzle 40 and a thrust reverser 42. The nozzle 40 and thrust reverser include a common part, section 44, which is moveable between a plurality of axial positions relative to the centerline axis A. In this example, the section 44 is a hollow sleeve-like structure that extends about a cascade section 46. Actuators 48 are mounted within the nacelle 28 in this example. Links 50 extend through the cascade section 46 and are coupled on one end with the respective actuators 48 and on an opposite end with the section 44 in a known manner. A controller 49 communicates with the actuators 48 to selectively axially move the section 44. The controller 49 may be dedicated to controlling the integrated mechanism 30, integrated into an existing engine controller within the gas turbine engine 10, or be incorporated with other known aircraft or engine controls. Alternatively, one or more of the actuators 48 are mounted within the cascade section 46 in a known manner.

In the disclosed example, the cascade section 46 includes a plurality of apertures 52, or vents, that provide a flow path between the bypass passage 32 and the exterior environment of the gas turbine engine 10. The apertures 52 may be formed in any known suitable shape, such as with airfoil shaped vanes between the apertures. In this example, the apertures 52 are arranged in circumferential rows about the cascade section 46. A first set of apertures 52a near the forward end of the cascade section 46 are angled aft and a second set of apertures 52b aft of the first set of apertures 52a are angled forward. Axial movement of the section 44 selectively opens, or exposes, the apertures 52a, apertures 52b, or both to provide an auxiliary passage for the discharge flow, as will be described below.

In the illustrated example, there are two circumferential rows in the first set of apertures 52a and a larger number of circumferential rows in the second set of apertures 52b. In one example, two circumferential rows in the first set of apertures 52a is adequate for altering the discharge flow, as will be described. However, it is to be understood that one circumferential row or greater than two circumferential rows may be used for smaller or larger alterations, respectively.

Figure 3B:
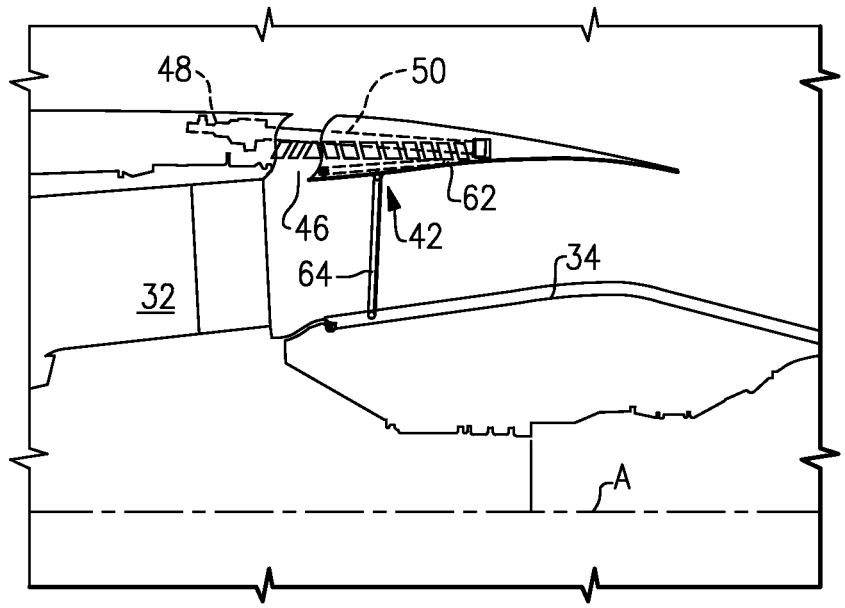
FIG. 3B illustrates a schematic view of the axially moveable section in an intermediate position for altering a discharge flow from the gas turbine engine.
Figure 3C:
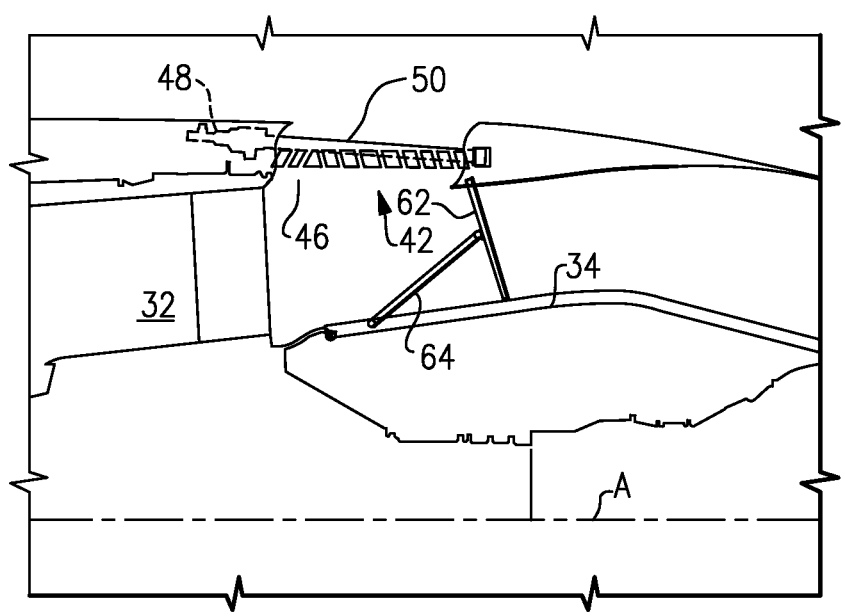
FIG. 3C illustrates a schematic view of the axially moveable section in an open position for generating a thrust reversing force.

The thrust reverser 42 includes a blocker door 62 having a stowed position (FIG. 3A) and a fully deployed position (FIG. 3C). The blocker door 62 is pivotally connected to the section 44 at connection 63. A drag link 64 includes one end that is slidably connected to the blocker door 62 and an opposite end that is connected to a support, the inner cowl 34 in this example. Although only one drag link 64 is shown, it is to be understood that any suitable number of drag links 64 may be used.

Figure 4:
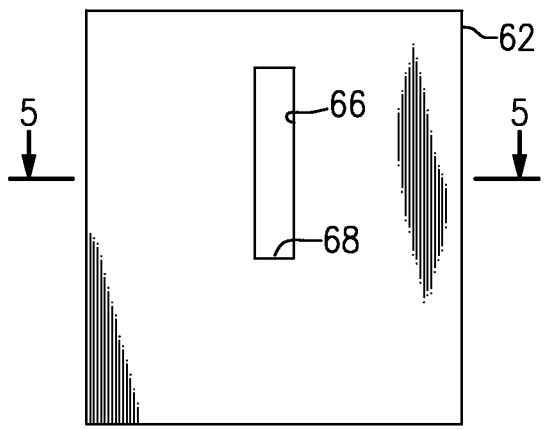
FIG. 4 illustrates a blocker door of the thrust reverser.
Figure 5:
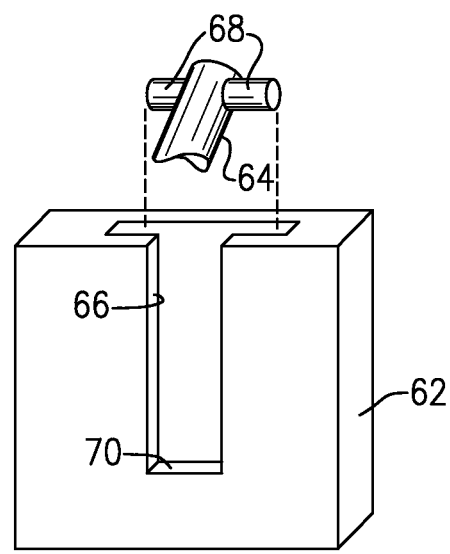
FIG. 5 illustrates a view of an example slot of the blocker door according to the section shown in FIG. 4.

Referring to FIGS. 4 and 5, the blocker door 62 includes a slot 66 for slidably connecting the drag link 64 to the blocker door 62. In this example, the shape of the slot 66 is adapted to receive and retain the end of the drag link 64. For example, the slot 66 is T-shaped and the end of drag link 64 includes laterally extending slide members 68, such as rollers, bearings, friction material, or other known suitable mechanism for allowing the end of the drag link 64 to slide along the slot 66. Given this description, one of ordinary skill in the art will recognize alternative suitable slot shapes or sliding connections to meet their particular needs.

In operation, the controller 49 selectively commands the actuators 48 to move the section 44 between the plurality of axial positions to alter the discharge flow or provide thrust reversal. FIG. 3A illustrates the section 44 in a first axial position (i.e., a closed position) sealed against the nacelle 28. In the closed position, the section 44 completely covers the cascade section 46 such that the discharge flow exits axially through the rear exhaust 36.

FIG. 3B illustrates the section 44 in a second axial position spaced apart from the nacelle 28 to provide an opening there between and expose a portion of the cascade section 46. In the second position, the first set of apertures 52a are exposed to provide an auxiliary passage for the discharge flow. The auxiliary passage provides an additional passage (i.e., additional effective cross-sectional flow area) for exit of the discharge flow from the bypass passage 32 to thereby alter the discharge flow. A portion of the discharge flow flows through the first set of apertures 52a and is directed in the aft direction. Although the aft angle in the illustrated example is not parallel to the centerline axis A, a geometric component of the aft angle is parallel. The geometric component of the discharge flow that is parallel to the centerline axis A provides the benefit of maintaining a portion of the thrust generated by the discharge flow.

Upon movement of the section 44 between the first position and the second position, the blocker door 62 remains in the stowed position. The connection between the drag link 64 and the slot 66 provides a range of lost motion movement. That is, the movement of the section 44 causes the drag link 64 to slide along the slot 66 of the blocker door 62 without moving the blocker door 62 into the deployed position.

FIG. 3C illustrates the section 44 in a third axial position (i.e., a thrust reverse position). Movement of the section 44 beyond the second position toward the third position causes the end of the drag link 64 to engage an end 70 of the slot 66. Once engaged, the drag link 64 pivots the blocker door 62 about the connection 63 and into the bypass passage 32. The blocker door 62 deflects the discharge flow radially outwards relative to the centerline axis A toward the cascade section 46. The movement of the section 44 to the third position also exposes the apertures 52b. The deflected discharge flow enters the second set of apertures 52b, which angle the discharge flow in the forward direction to generate a reverse thrust force.

In this example, there are more apertures 52 within the first set of apertures 52b than in the second set of apertures 52a. Thus, the reverse thrust force due to discharge flow through the second set of apertures 52b overcomes any thrust due to aft discharge flow from the apertures 52a.

The disclosed example integrated mechanism 30 thereby integrates the function of altering the discharge flow with the thrust reversing function. The integrated mechanism 30 utilizes a single set or system of actuators 48 to eliminate the need for separate actuators or sets of actuators for altering the discharge flow and deploying the thrust reverser. Using a single actuator or set of actuators 48 as in the disclosed examples eliminates at least some of the actuators that would otherwise be used, thereby reducing the weight of the gas turbine engine 10 and increasing the fuel efficiency.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:
1. A gas turbine engine comprising:
   a core engine defined about an axis;

a fan driven by said core engine about said axis to generate bypass flow;

at least one integrated mechanism in communication with the bypass flow, the integrated mechanism configured such that axial movement of the integrated mechanism exposes a cascade section, the cascade section including a first set of apertures angled in an aft direction and a second set of apertures angled in a forward direction, the at least one integrated mechanism including a variable area fan nozzle (VAFN) and a thrust reverser, the integrated mechanism movable between a plurality of axial positions to selectively expose the first and second sets of apertures, wherein the thrust reverser includes a blocker door moveable between a stowed position and a deployed position, and wherein the thrust reverser includes a link slidably connected to the blocker door; and wherein the blocker door includes a slot having a T-shaped cross section, the slot slidably receiving the link.

2. The gas turbine engine of claim 1, wherein the bypass flow is arranged to communicate with an exterior environment when the integrated mechanism is in a deployed position.

3. The gas turbine engine of claim 2, wherein the integrated mechanism includes a plurality of apertures to enable the communication of the bypass flow with the exterior environment when the integrated mechanism is in the deployed position.

4. The gas turbine engine of claim 3, wherein the integrated mechanism includes a single actuator set to move between the plurality of positions.

5. The gas turbine engine of claim 4, wherein, when in the deployed position, the thrust reverser diverts the bypass flow in a thrust reversing direction.

6. The gas turbine engine of claim 5, wherein the at least one integrated mechanism is arranged to change a pressure ratio across the fan.

7. The gas turbine engine system as recited in claim 5, wherein the first set of apertures are angled in the aft direction by a first set of airfoil shaped vanes, and wherein the second set of apertures are angled in the forward direction by a second set of airfoil shaped vanes.

8. The gas turbine engine as recited in claim 7, wherein there are a greater number of circumferential rows of the second set of apertures than a number of circumferential rows of the first set of apertures.

9. The gas turbine engine as recited in claim 8, wherein there are two circumferential rows of the first set of apertures and at least three circumferential rows of the second set of apertures.

10. The gas turbine engine system as recited in claim 1, wherein:

when the integrated mechanism is in a first axial position, the integrated mechanism completely covers the cascade section and the thrust reverser is in a stowed position;

when the integrated mechanism is in a second axial position, the integrated mechanism exposes the first set of apertures of the cascade section and covers the second set of apertures; and when the integrated mechanism is in a third axial position, the integrated mechanism exposes both the first set of apertures and the second set of apertures, and the thrust reverser is in the deployed position.

11. The gas turbine engine as recited in claim 1, wherein the integrated mechanism includes a hollow sleeve-like structure extending about the cascade section, the hollow sleeve-like structure moveable between a plurality of positions to selectively expose the first and second sets of apertures.

12. The gas turbine engine as recited in claim 11, further comprising:

a nacelle extending circumferentially around the fan;

at least one actuator mounted within one of the nacelle and the cascade section; and a controller, the at least one actuator configured to selectively move the hollow sleeve-like structure in response to instructions from the controller.

13. The gas turbine engine as recited in claim 12, wherein the link is pivotally connected to an inner cowl of the gas turbine engine.

14. The gas turbine engine as recited in claim 13, wherein the blocker door is pivotally connected to the hollow sleeve-like structure.

15. The gas turbine engine as recited in claim 14, wherein the connection between the link and blocker door provides a range of lost motion such that, within the range of lost motion, movement of the hollow sleeve-like structure does not cause the blocker door to move into the deployed position.

16. A gas turbine engine comprising:

a core engine defined about an axis, said core engine including at least a low pressure turbine;

a fan couple to be driven by said core engine about said axis to generate a bypass flow;

at least one integrated mechanism in communication with the bypass flow, the at least one integrated mechanism including a variable area fan nozzle (VAFN) and a thrust reverser, the at least one integrated mechanism configured such that axial movement of the at least one integrated mechanism exposes a cascade section, the cascade section including a first set of apertures angled in an aft direction and a second set of apertures angled in a forward direction, the integrated mechanism movable between a plurality of axial positions to selectively expose the first and second sets of apertures, wherein the integrated mechanism includes a section common to the thrust reverser and VAFN, wherein the thrust reverser includes a blocker door moveable between a stowed position and a deployed position, and wherein the thrust reverser includes a link slidably connected to the blocker door; and wherein the blocker door includes a slot having a T-shaped cross section, the slot slidably receiving the link.

17. The gas turbine engine of claim 16, wherein the integrated mechanism includes at least one actuator set to move between the plurality of positions.

18. The gas turbine engine of claim 17, wherein, when in the deployed position, the thrust reverser diverts the bypass flow in a thrust reversing direction.

19. The gas turbine engine of claim 16, wherein the common section is moveable between a plurality of axial positions and has a plurality of apertures providing a flow path for the bypass flow to reach an exterior environment of the gas turbine engine.

20. The gas turbine engine as recited in claim 19, wherein the common section is a hollow sleeve-like structure, and wherein the connection between the link and blocker door provides a range of lost motion such that, within the range of lost motion, movement of the hollow sleeve-like structure does not cause the blocker door to move into the deployed position.

21. The gas turbine engine of claim 16, wherein the link has one end slidably connected to the blocker door and an opposite end connected to a support.

22. A gas turbine engine comprising:
   a core engine defined about an axis, said core engine including at least a low pressure turbine;
   a fan couple to be driven by said core engine about said axis to generate a bypass flow;
   at least one integrated mechanism in communication with the bypass flow, the at least one integrated mechanism including a variable area fan nozzle (VAFN) and a thrust reverser, the integrated mechanism including a plurality of positions to control bypass flow, wherein the integrated mechanism includes a section common to the thrust reverser and VAFN;
   wherein the thrust reverser includes a blocker door moveable between a stowed position and a deployed position and a link having one end connected to the blocker door and an opposite end connected to a support; and
   wherein the blocker door includes a slot having a T-shaped cross section, the slot slidably receiving the link.

23. The gas turbine engine as recited in claim 22, wherein the at least one integrated mechanism is configured such that axial movement of the integrated mechanism exposes a cascade section, the cascade section including a first set of apertures angled in an aft direction and a second set of apertures angled in a forward direction, the at least one integrated mechanism movable between a plurality of axial positions to selectively expose the first and second sets of apertures.

24. The gas turbine engine as recited in claim 23, wherein there are a greater number of circumferential rows of the second set of apertures than a number of circumferential rows of the first set of apertures.

25. The gas turbine engine as recited in claim 24, wherein there are two circumferential rows of the first set of apertures and at least three circumferential rows of the second set of apertures.

* * * * *

UNITED STATES PATENT AND TRADEMARK OFFICE
CERTIFICATE OF CORRECTION

PATENT NO. : 9,759,158 B2  
APPLICATION NO. : 13/332529  
DATED : September 12, 2017  
INVENTOR(S) : Richard M. Marshall Page 1 of 1

It is certified that error appears in the above-identified patent and that said Letters Patent is hereby corrected as shown below:

On the Title Page

In item (73), Assignee; before "Hartford, CT" replace "CORPORATIO," with --CORPORATION,--

Signed and Sealed this
Twenty-eighth Day of August, 2018

Andrei Iancu
*Director of the United States Patent and Trademark Office*